United States Patent [19]
Boffardi et al.

[11] 3,965,027
[45] June 22, 1976

[54] SCALE INHIBITION AND CORROSION INHIBITION

[75] Inventors: Bennett P. Boffardi, Bethel Park; Michael M. Cook, McKees Rocks; Paul H. Ralston, Bethel Park, all of Pa.

[73] Assignee: Calgon Corporation, Pittsburgh, Pa.

[22] Filed: Mar. 11, 1974

[21] Appl. No.: 450,029

[52] U.S. Cl. .............................. 252/180; 21/2.7 R; 210/58; 252/390; 260/501.1; 260/501.17; 260/501.2
[51] Int. Cl.² .......................................... C02B 5/00
[58] Field of Search....... 260/501.11, 501.1, 501.17, 260/501.2; 252/180, 389 R, 390, 392; 210/58; 21/2.7 R

[56] References Cited
UNITED STATES PATENTS

| | | | |
|---|---|---|---|
| 3,549,538 | 12/1970 | Jacklin | 210/58 |
| 3,617,577 | 11/1971 | King | 210/58 |
| 3,715,307 | 2/1973 | Johnson | 210/58 |
| 3,810,834 | 5/1974 | Jones | 252/180 |

*Primary Examiner*—Mayer Weinblatt
*Assistant Examiner*—Edith R. Buffalow
*Attorney, Agent, or Firm*—Harry E. Westlake, Jr.; Raymond M. Speer

[57] ABSTRACT

A method of inhibiting corrosion and scale formation in an aqueous system is disclosed which comprises the step of treating the said system with 0.1 to 500 parts per million by weight of the total aqueous content of the said system, of a composition which may additionally include zinc and which comprises a polymer selected from the group consisting of:
polymers having recurring units of the formula:

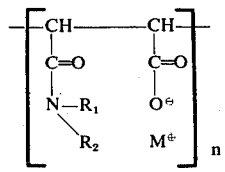

wherein $M^\oplus$ may be $H^\oplus$, alkali metal cation, or quaternary ammonium cation of the formula:

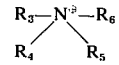

wherein for all of the above formulas, $R_1$, $R_2$, $R_3$, $R_4$, $R_5$, and $R_6$ are each independently selected from the group consisting of hydrogen, alkyl of from one to 10 carbon atoms, and substituted alkyl of from one to 10 carbon atoms, where the substituent is hydroxyl; carbonyl; and carboxylic acid groups, and alkali metal ion and ammonium salts thereof; and wherein $n$ is an integer of from 2 to 100; and polymers having recurring units of the formula:

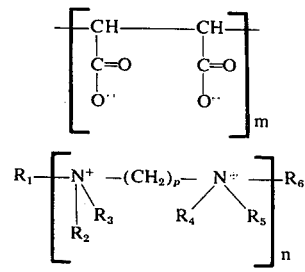

wherein $R_1$, $R_2$, $R_3$, $R_4$, $R_5$, and $R_6$ are each independently selected from the group consisting of hydrogen, alkyl of from one to 10 carbon atoms, and substituted alkyl of from one to 10 carbon atoms, where the substituent is hydroxyl; carbonyl; and carboxylic acid groups, and alkali metal ion and ammonium salts thereof;
wherein $p$ is an integer of from 1 to 6;
wherein $m$ is an integer of from 2 to 100; and
wherein $n$ is an integer of from 2 to about 100, provided that, $n$ not equal to $m$, the lesser of $m$ or $n$ is multiplied by a factor such that $n = m$.

8 Claims, No Drawings

SCALE INHIBITION AND CORROSION INHIBITION

BACKGROUND OF THE INVENTION

1. Field of the Invention

The present invention relates to a method of inhibiting the corrosion of and the formation of scale deposits on metallic surfaces of water-carrying systems, particularly, with regard to corrosion, where the water of the system is oxygen-bearing. More particularly, the present invention relates to the use of compositions comprising amine adducts of polymaleic anhydride to inhibit the corrosion of and the formation of scale deposits on metallic surfaces of water-carrying systems. Most particularly, the present invention concerns the use of compositions comprising amine adducts of polymaleic anhydride together with zinc to inhibit the corrosion of metallic surfaces of aqueous systems.

The term "aqueous", as used herein, is intended to describe water in any physical state and to include water in which is dissolved or dispersed any substance, for example, inorganic salts in brine or seawater.

The term "metallic", as used herein, is intended to include metallic and metal-containing materials comrising ferrous, non-ferrous or alloy metal compositions.

Polymaleic anhydride, as used herein, is intended to include hydrolyzed polymaleic anhydride, which is essentially polymaleic acid. Under most ambient conditions, such hydrolysis to the acid form will take place.

Generally, scale deposits are incrustation coatings which may be formed from a wide variety of simple and complex inorganic salts which accummulate on the metallic surfaces of a water-carrying system through a number of different causes. While the method and compositions of the present invention have been found particularly useful in providing inhibition of calcium carbonate and calcium sulfate scales, inhibition of magnesium hydroxide, calcium fluoride, calcium phosphate, and other common scales may also be obtained. Various industrial and commercial water-carrying systems are subject to scale formation problems. Scale is of particular concern in heat exchange systems employing water, such as, for example, boiler systems, and once-through and open recirculating water cooling systems.

The water employed in these systems ordinarily will contain a number of dissolved salts, the amount and nature of which will, of course, depend upon the source of the water employed. Thus, the water usually contains alkaline earth metal cations, primarily calcium and magnesium, and such anions as bicarbonate, carbonate, sulfate, silicate, phosphate, oxalate, fluoride, and so forth. Combination products of these anions and cations will precipitate from the water in which they are carried to form scale deposits when the concentration of the anion and cation comprising the combination or reaction product exceed the solubility of the reaction product. Thus, when the concentrations of calcium ion and carbonate ion exceed the solubility of the calcium carbonate reaction product, a solid phase of calcium carbonate will form as a precipitate. Precipitation of the reaction product will continue until the solubility product concentrations of the constituent ions are no longer exceeded.

Numerous factors may be responsible for producing a condition of supersaturation for a particular reaction product. Among such factors are changes in the pH of the water system, evaporation of the water phase, rate of heat transfer, amount of dissolved solids, and changes in the temperature or pressure of the system.

For boiler systems and similar heat exchange systems, the mechanism of scale formation is apparently one of crystallization of scale-forming salts from a solution which is locally supersaturated in the region adjacent the heating surface of the system. The thin viscous film of water in this region tends to become more concentrated than the remainder of the solution outside this region. As a result, the solubility of the scale-forming salt reaction product is first exceeded in this thin film, and crystallization of scale results directly on the heating surface.

In addition to this, a common source of scale in boiler systems is the breakdown of calcium bicarbonate to form calcium carbonate, water and carbon dioxide under the influence of heat. For open recirculating cooling water systems, in which a cooling tower, spray pond, evaporative condenser, and the like serve to dissipate heat by evaporation of water, the chief factor which promotes scale formation is concentration of solids dissolved in the water by repeated evaporation of portions of the water phase. Thus, even a water which is not scale forming on a once-through basis usually will become scale forming when concentrated two, four, or six times. The formation of scale deposits poses a serious problem in a number of regards. The different types of scale which are formed all possess a low degree of heat conductivity. Thus, a scale deposit is essentially an insulating layer imposed across the path of heat travel from whatever source to the water of the system. In the case of a boiler system, the retarded heat transfer causes a loss in boiler efficiency. Increased input of heat to compensate for this loss results in overheating of the boiler metal and consequent tube failures. In addition to this problem, scale formation facilitates corrosive processes, and a substantial scale deposit will interfere materially with fluid flow. Consequently, scale is an expensive problem in many industrial water systems, causing delays and shutdowns for cleaning and removal.

Corrosion of the metallic surfaces of a water-carrying system consists of the destruction of the metal by chemical or electrochemical reaction of the metal with its immediate environment.

Where the corrosion is electrochemical in nature, a transfer or exchange of electrons is necessary for the corrosion reaction to proceed. When corrosion of the metal takes place, two partial electrochemical processes occur, and must occur, simultaneously. There is an anodic oxidation reaction in which metal ions go into solution, leaving behind electrons; and a cathodic reduction reaction in which species in solution are reduced by consuming the electrons produced by the anodic reaction. Where the metal is ferrous or ferrous-containing, and the water system contains oxygen, these two processes may be illustrated by the following equations:

Anodic oxidation: $Fe \rightarrow Fe^{++} + 2e^-$

Cathodic reduction: $2H_2O + O_2 + 4e^- \rightarrow 4OH^-$

The two ionic reaction products, ferrous ion and hydroxyl ion, combine to form ferrous hydroxide, Fe(OH)$_2$, which is then oxidized to form rust, ferric hydroxide, $Fe(OH)_3$. For ferrous or ferrous-containing as well as other metals in water systems, the principal factors influencing the corrosion process are the characteristics of the water of the system, the rate of water flow, the temperature of the system and the contact of dissimilar metals in the system. The variable characteristics of the water which determine its corrosiveness are its dissolved oxygen concentration, carbon dioxide content, pH and concentration of dissolved solids. Other factors may be involved, as, for example, the presence of free mineral acid, hydrogen sulfide, sulfur dioxide, and so forth.

The pressence of oxygen dissolved in the water of a system is primarily the result of contact of the water with the atmosphere. The oxygen solubility in water is temperature and pressure dependent, with an increase in pressure increasing solubility, and with an increase in temperature lowering the oxygen solubility.

Corrosion produced by the presence of oxygen in the water of a system can take place in the form of small pits or depressions. As the corrosive process continues, these pits or depressions increase in area and depth and a nodule of corrosion products is formed. The corrosive attack is more severe when taking place in the form of pits or depressions since this permits deeper penetration of the metal and more rapid failure at these points.

2. Description of the Prior Art

Early efforts to reduce scale formation in water-carrying systems employed compounds such as tannins, modified lignins, algins, and other similar materials. However, use of these compounds entailed a number of disadvantages, including oxidation of the compounds in boiler systems, decomposition of the compounds on metal surfaces with resultant deposition of carbon, and the requirement of relatively large amounts of the compounds to achieve scale inhibition.

Chelating or sequestering agents have been employed to prevent precipitation or crystallization of scale-forming compounds. Such agents usually act by forming a water soluble complex with the cation constituent of the scale-forming compound, thus effectively inactivating the cation constituents so that their solubility product concentrations are not exceeded and precipitation or crystallization does not occur. However, it is inherently required that at least stoichiometric amounts of such chelants or complexing agents be employed, and generally it is necessary to use many times as much chelant as cation present. But, the use of such large amounts of treating agent is seldom desirable or economical. Moreover, proper application of qualified chelants involves optimum levels of suitable supplementary dispersing agents and the maintenance of favorable alkalinity as well as pH conditions.

Another type of agent which has been actively explored by the prior art as a scale inhibiting material is the threshold active inhibitor. Such materials are effective as scale inhibitors in amounts considerably less than that stoichiometrically required, and this amount is termed the threshold amount. The concept of threshold amounts will be further described hereinafter.

Inorganic polyphosphates have long been used as such threshold active inhibitors. For examples of such materials, see Fink and Richardson — U.S. Pat. No. 2,358,222; Hatch — U.S. Pat. No. 2,539,305; and Ralston — U.S. Pat. No. 3,434,969.

A number of different polymeric materials have been previously employed as scale inhibiting agents. In particular, a number of polyacrylic, polymaleic, and polymaleic anhydride homopolymers and copolymers have found use. Johnson — U.S. Pat. No. 2,723,956 discloses a method of reducing scale in boilers by incorporating in the boiler water-soluble copolymers of maleic anhydride and another polymerizable monoethylenic compound. Robertson — U.S. Pat. No. 3,289,734 discloses a method of inhibiting scale formation on metal surfaces of a multiple-effect evaporator used for the processing of black liquor by treating the black liquor with a copolymer material comprised of alkane and maleic acid or anhydride units. Herbert et al. — U.S. Pat. No. 3,293,152 discloses a method of preventing the formation of scale deposits on the heat transfer surfaces of apparatus used for the evaporation of sea water which consists of adding to the sea water a polyacrylic acid having a molecular weight of between about 20,000 and about 960,000. Engman et al. — U.S. Pat. No. 3,516,910 discloses a method of inhibiting scale formation on metal surfaces of an evaporator used for the processing of black liquor by treating the black liquor with a water-soluble polymer which may be polymethacrylic acid, higher polyalkylacrylic acids, and copolymers and terpolymers of acrylic acid, methacrylic and higher alkylacrylic acids with each other and other vinyl monomers. These water soluble polymers may have a molecular weight from 1,000 up to 200,000. Jacklin — U.S. Pat. No. 3,549,538 discloses a method of inhibiting and removing scale in boilers used to generate steam from water which comprises adding to the boiler water a composition consisting of a mixture of a nitrilo compound and a water soluble sulfoxy free polar addition polymer. In particular, the polar addition polymer may be a maleic anhydride polymer. Woodard — U.S. Pat. No. 3,574,175 discloses copolymers of hydrochlorides, of N,N-diallyglycinonitrile, N,N-diallyglycinamide, and N,N-diallyglycine with acrylic acid and acrylamide useful as scale formation inhibiting agents. Hwa et al. — U.S. Pat. No. 3,578,589 discloses a method for inhibiting deposition of scale, mud, silt, sludge, and other foulants, in water cooled industrial heat exchange and water cooling systems which comprises adding to the cooling water a nonionic surface active agent and a water soluble polymer having a weight average molecular weight of at least 400 and selected from the group consisting of polyacrylic acid, polymethacrylic acid, and acrylic acid-methacrylic acid copolymers. Rice et al. — U.S. Pat. No. 3,589,998 discloses a method of inhibiting scale formation on the surface of membranes used in reverse osmosis water treatment which comprises adding to the input water a composition comprising the reaction product of acrylic acid, thioglycolic acid, and ammonium persulfate. King — U.S. Pat. No. 3,617,577 discloses a method of inhibiting scale formation in aqueous systems by maintaining in such a system a threshold concentration of a linear ethylene-maleic acid copolymer having a molecular weight of from about 1,000 to 5,000. Johnson — U.S. Pat. No. 3,715,307 discloses a method of treating water used in heat transfer equipment by adding to the feed water a water soluble, low molecular weight linear copolymer of maleic anhydride and a copolymerizable ethylenically unsaturated compound such as ethylene, vinyl acetate, acrylonitrile, acrylic acid, methyl vinyl ether, styrene and the like. In addition to the above disclosures, methods and materials for water clarification or purification wherein the compositions employed are similar to those discussed above, are set out in Johnson et al. — U.S. Pat. No. 3,157,595; Fields et al. — U.S. Pat. No. 3,398,092; Ryznar — U.S. Pat. No. 3,492,226; and Fields et al. — U.S. Pat. No. 3,554,985.

A variety of compositions have been employed in the art for the purpose of inhibiting corrosion of surfaces in water-carrying systems. Where the cause of the corrosion is dissolved oxygen, sodium sulfite is commonly used as an oxygen scavenging chemical deaerator. Catalytic aids for this process have also been developed. Hydrazine has been used as a reducing agent for the dissolved oxygen, giving only water and nitrogen as reaction products. Polyphosphates, for example sodium tripolyphosphate, are widely used in the treatment of once-through systems. Silicates, for example, sodium silicate, have also found acceptance.

Hatch et al. — U.S. Pat. No. 3,483,133 discloses a corrosion inhibiting composition comprising aminomethylphosphonic acid compounds in combination with water soluble zinc salts. Oude Allnk — U.S. Pat. No. 3,762,873 discloses a corrosion inhibiting method using substituted succinimides. Kerst — Canadian Pat. No. 854,151 discloses a composition and method for inhibiting corrosion and/or the formation of calcium and magnesium containing scales where a combination of organophosphonic acid compounds and water soluble polymers having carboxyl or amide groups is employed. South African Pat. No. 71/7985 discloses a method of treating the water of an aqueous system with hydrolyzed polymaleic anhydride having a molecular weight of 300 to 5,000 for the purpose of inhibiting scale formation; while German Pat. No. 2,259,954 discloses the use of the same hydrolyzed polymaleic anhydride material in combination with a zinc salt for the purpose of inhibiting both corrosion and scale formation.

SUMMARY OF THE INVENTION

The method of the present invention for inhibiting the corrosion of and the formation of scale deposits on metallic surfaces of water-carrying systems employs amine adducts of maleic anhydride polymer compositions selected from the group consisting of:

polymers having recurring units of the formula:

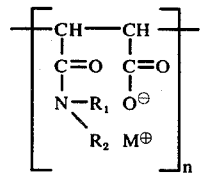

wherein $M^+$ may be $H^+$, alkali metal cation, or quaternary ammonium cation of the formula:

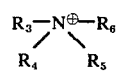

wherein for all of the above formulas, $R_1$, $R_2$, $R_3$, $R_4$, $R_5$, and $R_6$ are each independently selected from the group consisting of hydrogen, alkyl of from one to 10 carbon atoms, and substituted alkyl of from one to 10 carbon atoms, where the substituent is hydroxyl; carbonyl; and carboxylic acid groups, and alkali metal ion and ammonium salts thereof; and wherein $n$ is an integer of from 2 to 100; and polymers having recurring units of the formula:

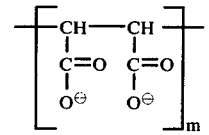

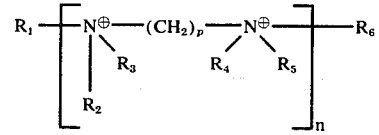

wherein $R_1$, $R_2$, $R_3$, $R_4$, $R_5$, and $R_6$ are each independently selected from the group consisting of hydrogen, alkyl of from one to 10 carbon atoms, and substituted alkyl of from one to 10 carbon atoms, where the substituent is hydroxyl; carbonyl; and carboxylic acid groups, and alkali metal ion and ammonium salts thereof;

wherein $p$ is an integer of from 1 to 6;

wherein $m$ is an integer of from 2 to 100; and wherein $n$ is an integer of from 2 to about 100, provided that, $n$ not equal to $m$, the lesser of $m$ or $n$ is multiplied by a factor such that $n = m$.

Representative examples of the polymer compositions useful in the corrosion inhibiting and scale formation inhibiting method of the present invention are as follows:

The mono-amido, ammonium salt of polymaleic anhydride, having recurring units represented by the following structural formula:

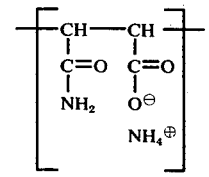

polymaleic anhydride sodium iminodiacetate having recurring units represented by the formula:

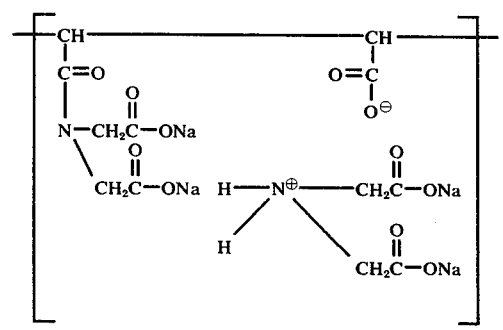

polymaleic anhydride ethanol amine adduct having recurring units of the formula:

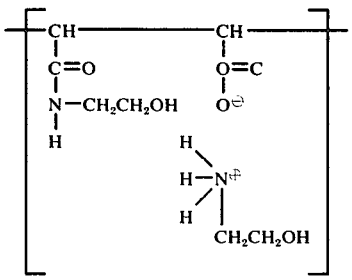

polymaleic anhydride diethanol amine adduct having recurring units of the formula:

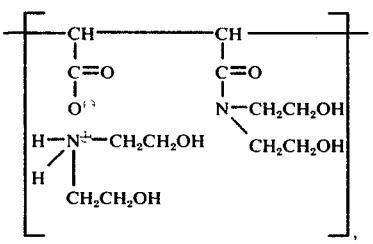

and
polymaleic acid N,N,N',N'-tetramethyl-diaminoethane ammonium salt having recurring units of the formula:

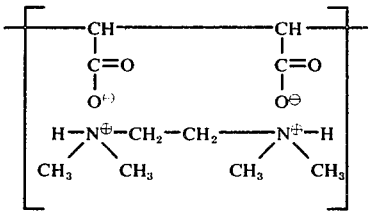

It has been discovered that there is a synergistic effect on corrosion inhibition when the amine adducts of maleic anhydride polymer compositions of the present invention are employed together with zinc, which in an aqueous system will be active as zinc ion. That is, the use of the amine adducts of polymaleic anhydride together with the zinc ion has been found to more effectively inhibit corrosion than does an equal concentration of either the amine adduct of polymaleic anhydride or the zinc ion alone. This synergistic action is obtained when a mixture of the components is used which contains the polymer and zinc in a weight ratio of from about 1:5 to about 50:1, respectively, and preferably in a weight ratio of from about 1:1 to about 20:1, respectively. The zinc is calculated as $Zn^{++}$.

The zinc ion component of the corrosion inhibiting composition of the present invention is provided by employing zinc in any convenient water soluble form, such as the chloride or the sulfate salt.

The amine adducts of maleic anhydride polymer compositions of the present invention are preferably low molecular weight polymers having a weight average molecular weight of from about 200 to about 10,000. These polymer compositions are also preferably employed in their water soluble forms as, for example, the alkali metal or ammonium salts thereof. The makeup of these polymer compositions with respect to the proportionate amounts of the constituent maleic anhydride and amine groups present in the polymer chain may vary, such that the molar ratio of amine to maleic anhydride groups may be from about 0.1 to about 2.0.

Inhibition of scale deposit formation on metallic surfaces of water-carrying systems, using the amine adducts of maleic anhydride polymer compositions described above in accordance with the present invention, is achieved by the addition of "threshold amounts" of the scale inhibiting compositions to the system to be treated. As used herein, the term "threshold amount" is intended to define a range of concentration amounts of treating composition which is less than that stoichiometrically required to react with the scale-forming cation.

The treatment concentration of the amine adducts of maleic anhydride polymer compositions employed in the present invention to inhibit scale deposit formation may be at levels ranging between 0.1 and 500 p.p.m. by weight of the total solution of the water-carrying system being treated. Preferably, the concentration level range will be from about 1.0 to 200 p.p.m.

When the amine adducts of maleic anhydride polymer compositions of the present invention are added to a water-carrying system in the treatment concentrations indicated above for the purpose of inhibiting the formation of scale deposits, these compositions are equally effective in such a system for inhibiting corrosion of the metallic surfaces of the system. While these concentration levels are not accurately described as "threshold" concentration levels, as will be understood from a consideration of the above discussion of the concept of "threshold amount", nevertheless, the same range of concentration levels of the amine derivative maleic anhydride polymer compositions of the present invention are effective in a water-carrying system to inhibit both the formation of scale deposits on, and the corrosion of the surfaces, particularly the metal surfaces of, the said system.

The corrosion inhibiting compositions of the present invention will be effective to inhibit the corrosion of the metal-bearing surfaces of an aqueous system being treated when the said compositions are added to the aqueous system in amounts sufficient to maintain within the said system a concentration level of corrosion inhibiting composition ranging between 1.0 and 200 parts per million (p.p.m.) by weight of the total aqueous content of the aqueous system being treated. Preferably, the concentration level range will be from 2.0 to 100 p.p.m.

The present invention contemplates inclusion with the corrosion and scale inhibiting compositions thereof other known additives for the treatment of aqueous systems. Particularly, other inhibitors may be included. For example, a copper corrosion inhibitor selected from the group consisting of 1,2,3-triazoles, thiols of thiazoles, oxazoles, and imidazoles as described respectively in Hatch — U.S. Pat. Nos. 2,941,953 and 2,742,369 may be employed in an amount of up to about 10% by weight. Other compositions, such as those described above with respect to the prior art, may be employed.

The composition of the present invention will actively inhibit corrosion so long as they are effectively present in the aqueous system being treated. This effective presence is dependent on the lack of any degradation or decomposition of the inhibitor compositions occasioned by pH, temperature, pressure, or other conditions. Thus, it is anticipated that the inhibitor compositions of the present invention will be effective generally in a pH range of from about 6 to about 10, up to a temperature of about 300°F. and up to a pressure of about 100 atmospheres.

While polymaleic anhydride is itself not water soluble until hydrolyzed to the acid form, the amine adducts of polymaleic anhydride compositions of the present invention are water soluble. Thus, they are readily introduced into an aqueous system to be treated in any suitable manner known to the art.

The following examples illustrate both procedures for preparation of the amine adducts of maleic anhydride polymer compositions, as well as testing procedures demonstrating the utility of these compositions together with zinc as corrosion inhibitors. However, these examples are for purposes of illustration only and are not intended to in any way limit the scope of the present invention.

In the following preparative examples, the amine adducts of polymaleic anhydride, whose preparation is set out in Example 1, were synthesized by reacting the polymaleic anhydride in a non-polar solvent with the appropriate amine.

EXAMPLE 1

Preparation of Polymaleic Anhydride

A toluene solution of 10 g. of benzoyl peroxide was added to a solution of 50 g. (0.5 mole) of reagent grade maleic anhydride in 100 ml. of toluene at 70°C. The solution was observed to turn dark red, and a precipitate appeared during a period of 18 hrs. at 90°C. The solution was cooled to ambient temperature and the toluene was decanted. The remaining solid was taken up in warm methyl ethyl ketone and precipitated by addition to toluene. The resulting pink solid was removed by filtration and dried at 40°C. for 10 hrs. at 0.5 mm. Hg pressure. The yield was 19 g. of material. NMR spectrum ($d_6$ acetone) analysis of the reaction product showed a 3.9–4.9 ppm signal assigned to the methine protons of terminal maleic anhydride units ($C_6H_5CHC=O$). The other signals (3.0–3.6 ppm) were assigned respectively to the "internal" methine protons of the polymer and the aromatic protons of the end groups. The degree of polymerization was estimated at approximately 2–3 based on the integrated signal intensities.

EXAMPLE 2

Preparation of Polymaleic Anhydride Iminodiacetate Adduct 0.84 G. (7.5 mmole) of sodium carbonate and 1.30 g. (10 mmole) of iminodiacetic acid were added to 40 ml. of dimethylformamide and stirred 2 hrs. at 80°C. The solids were not completely dissolved. A polymaleic anhydride solution of 1.0 g. in 10 ml. of dimethylformamide was added, and the heterogeneous mixture was stirred for 18 hrs. at 60°C. The remaining solids were removed by filtration, and the solvent was removed at reduced pressure (14 mm Hg) at 40°C., leaving a dark oil. The last trace of solvent was removed under reduced pressure of 0.5 mm Hg at 39°C. for 18 hrs.

EXAMPLE 3

Preparation of Polymaleic Anhydride Diethanolamine Adduct

A heterogeneous mixture of 4.0 g. of polymaleic anhydride and 9.2 g. (80 mmole) of diethanolamine in 200 ml. of benzene and 100 ml. of acetone was heated under refluxing conditions for 18 hrs. The mixture was cooled, the solvents decanted, and the remaining polymer reaction product was washed twice with acetone. The polymer dissolved in water but could not be precipitated from methanol, acetone, or methyl ethyl ketone. The water was removed from the reaction product under reduced pressure (20 mm Hg) at 40°C. The viscous liquid was further dried at 40°C. under reduced pressure of 0.5 mm Hg for 18 hrs. and yielded a dark brown, hygroscopic polymer material.

EXAMPLE 4

Preparation of Polymaleic Anhydride Ethanolamine Adduct

A heterogeneous mixture of 4.9 g. (80 mmole) of ethanolamine and 4 g. of polymaleic anhydride in 250 ml. of benzene and 75 ml. of acetone was heated under refluxing conditions for 18 hrs. The solvents were decanted and the gummy polymer reaction product was washed with acetone and dissolved in water. The reaction product would not precipitate from acetone or methanol. The water was removed at reduced pressure (20 mm Hg) at 40°C. The resultant semi-solid was further dried under reduced pressure of 0.5 mm Hg at 40°C. for 18 hrs., yielding a dark brown hygroscopic polymer material.

EXAMPLE 5

Scale Inhibition

Experiments were performed to demonstrate the effectiveness of the amine adducts of maleic anhydride polymer compositions of the present invention in inhibiting the precipitation of scale-forming salts. In these experiments, solutions of two soluble salts were mixed together in the presence of the inhibitor composition to form a solution containing a relatively insoluble salt at several times its equilibrium concentration. As a control, each experiment was also conducted in the absence of any inhibitor composition. For example, in the case of the scale-forming salt, calcium carbonate ($CaCO_3$), 5 ml. of 0.1M $CaCl_2$ was added, with agitation, to a solution containing 490 ml. of distilled water and 5 ml. of 0.1M $Na_2CO_3$. In the control experiment no inhibitor was present in the test solution. In other experiments, various amounts of a scale inhibitor were present prior to the addition of the calcium chloride.

Specifically, inhibitor solutions at various concentrations were tested against supersaturated solutions of calcium carbonate, calcium sulfate, and magnesium hydroxide for 24 hours at 150°F. 500 Ml. test solutions were placed in flasks and maintained at 150°F. by means of a water bath. The supersaturation levels for the $CaCO_3$, $CaSO_4$, and $Mg(OH)_2$ salts were in the range of 4.0–4.5, 2.3–2.5, and 2.8–3.0; respectively.

The effectiveness of the inhibitor was found by using the Schwarzenbach titration method to determine the concentration of the calcium cation in solution. At the end of the test procedure, the concentration of calcium cation in the control solution, as determined by titration, was considered to be 0 percent inhibition. If no precipitate formed in an inhibited test solution and it therefore contained all of its original cation content, it was considered to be 100 percent inhibited. Titration results intermediate to the 0 percent and 100 percent inhibition values were directly related to these extremes and converted to percent inhibition.

The following table sets out data demonstrating the inhibition of deposition of calcium carbonate, calcium sulfate and magnesium hydroxide under the test conditions described above.

| Inhibitor Composition | Inhibitor Concentration (p.p.m.) | Percent Scale Inhibition CaSO$_4$ | CaCO$_3$ | Mg(OH)$_2$ |
|---|---|---|---|---|
| PMA$^1$-imino- | 5 | — | 98 | — |
| diacetate adduct | 30 | 93 | — | — |
| PMA-diethanol- | 5 | — | 26 | — |
| amine adduct | 30 | 62 | — | — |
| PMA-ethanol- | 5 | — | 11 | — |
| amine adduct | 30 | 7 | — | — |
| PMA-tetramethyl- | 1.25 | — | 97 | — |
| diaminoethane | 5 | — | — | 72 |
| adduct | 8 | 92 | — | — |
|  | 10 | 100 | — | — |
| PMA-monoamide | 0.9 | — | 97 | — |
| ammonium salt | 4 | 86 | — | — |
| adduct | 5 | 100 | — | 84 |

$^1$PMA = polymaleic anhydride.

EXAMPLE 6

Corrosion Inhibition

Corrosion inhibition properties of the amine adducts of maleic anhydride polymer compositions of the present invention were determined by means of potentiostatic polarization. This method provides a simple and direct means of quantifying metallic corrosion by measuring the polarizing effect of an applied current on the natural equilibrium of the partial anodic and cathodic currents inherent in the oxidation/reduction reaction of corrosion, and the resulting displacement of the potential of a metal electrode which is undergoing such corrosion. The applied current is measured as a function of the potential of the corroding electrode, which is controlled by means of a potentiostat. In particular, the Tafel slope extrapolation procedure was employed to determine corrosion rates. The potential of the working (corroding) electrode was plotted against the logarithm of the applied current. The resulting curve was linear in the so-called Tafel region and this was extrapolated to the corrosion potential value, which is the potential at which the metal of the working electrode corrodes in an aerated aqueous environment. The intercept point corresponds to the corrosion rate of the system expressed in terms of current density. In order to convert this value to the more conventional expression of corrosion rate in terms of milligrams per square decimeter per day (m.d.d.), the following conversion was used:

m.d.d. = 2.5 I$\mu$a/cm$^2$ where I$\mu$a/cm$^2$ is the current density at the point of intercept expressed as microamperes per square centimeter. This conversion is based on the relationship of the current density at the equilibrium or corrosion potential and the amount of iron consumed by corrosion [expressed as milligrams per square decimeter per day (m.d.d.)], which may be derived through Faraday's Law. For example, a current density of 4.0 × 10$^{-3}$ amperes/cm$^2$ is equal to 1.0 mg./dm.$^2$/day.

The tests were conducted in synthetic aerated water at an initial pH of 7.0, with a final pH as indicated in the table below. The composition of the synthetic water used in the polarization tests was as follows, indicating content per liter of distilled water:

| Ion | Ca$^{++}$ | Mg$^{++}$ | HCO$_3$$^-$ | Cl$^-$ | SO$_4$$^=$ |
|---|---|---|---|---|---|
| Mg./l. | 88 | 24 | 40 | 70 | 328 |

The total hardness as CaCO$_3$ was 318 mg./l. and the pH was 7.9. No. 1009 low carbon steel electrodes were used in the polarization test cells and the corrosion inhibitor concentrations were calculated on the basis of active material. The results of the potentiostatic polarization tests are illustrated in the table of data below.

| Inhibitor Composition | CONCENTRATION (p.p.m.) Polymer | Zn$^{++}$ | Corrosion Rate (m.d.d.) | Final pH |
|---|---|---|---|---|
| None (control) | 0 | 0 | 200 | 8.0 |
| PMA$^1$-iminodi- | 10 | — | 115 | 7.8 |
| acetate adduct | 50 | — | 70 | 7.8 |
|  | 100 | — | 40 | 7.9 |
|  | 50 | 10 | 2 | 7.8 |
| PMA-ethanol- | 10 | — | 120 | 7.3 |
| amine adduct | 50 | — | 80 | 7.4 |
|  | 100 | — | 110 | 7.8 |
|  | 50 | 10 | 18 | 7.6 |
| PMA-diethanol- | 10 | — | 85 | 7.8 |
| amine adduct | 50 | — | 85 | 7.9 |
|  | 100 | — | 42 | 7.6 |
|  | 50 | 10 | 3 | 7.8 |
| PMA-tetramethyl- | 50 | — | 125 | 8.0 |
| diaminoethane | 150 | — | 25 | 7.9 |
| adduct | 50 | 10 | 2 | 7.8 |
| PMA-monoamido- | 50 | — | 145 | 8.0 |
| ammonium salt | 150 | — | 18 | 7.9 |
| adduct | 50 | 10 | 6 | 7.8 |
| Zinc | 0 | 10 | 200 | 7.3 |
|  | 0 | 25 | 195 | 7.1 |

$^1$PMA = polymaleic anhydride.

Obviously many modifications and variations of the invention as hereinabove set forth can be made without departing from the essence and scope thereof, and only such limitations should be applied as are indicated in the appended claims.

What we claim is:

1. A method of inhibiting corrosion and scale formation in an aqueous system comprising the step of treating the said system with 0.1 to 500 parts per million by weight of the total aqueous content of the said system, of a composition selected from the group consisting of:

a. polymers having recurring units of the formula:

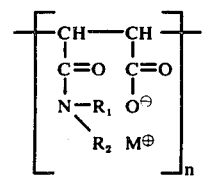

wherein M$^\oplus$ may be H$^\oplus$, alkali metal cation, or quaternary ammonium cation of the formula:

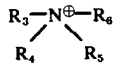

wherein for all of the above formulas, $R_1$, $R_2$, $R_3$, $R_4$, $R_5$, and $R_6$ are each independently selected from the group consisting of hydrogen, alkyl of from one to 10 carbon atoms, and substituted alkyl of from one to 10 carbon atoms, where the substituent is hydroxyl, carbonyl, and carboxylic acid groups, and alkali metal ion and ammonium salts thereof;

wherein $n$ is an integer of from 2 to 100, such that the polymer has a weight average molecular weight of from about 200 to about 10,000; and wherein for the polymer the molar ratio of amine to maleic anhydride is from about 0.1 to about 2.0; and b. polymers having recurring units of the formula:

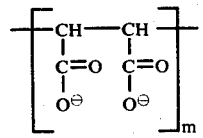

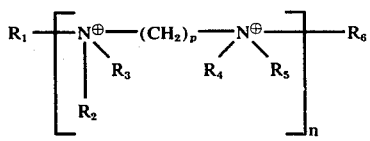

wherein $R_1$, $R_2$, $R_3$, $R_4$, $R_5$, and $R_6$ have the same meaning as above;

wherein $p$ is an integer of from 1 to 6;

wherein $m$ is an integer of from 2 to 100; and wherein $n$ is an integer of from 2 to about 100, such that the polymer has a weight average molecular of from about 200 to about 10,000, provided that, $n$ not equal to $m$, the lesser of $m$ or $n$ is multiplied by a factor such that $n = m$; and wherein for the polymer the molar ratio of amine to maleic anhydride is from about 0.1 to about 2.0.

2. The method of claim 1 wherein the polymer composition employed therein comprises recurring units of the following formula:

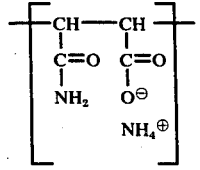

3. The method of claim 1 wherein the polymer composition employed therein comprises recurring units of the following formula:

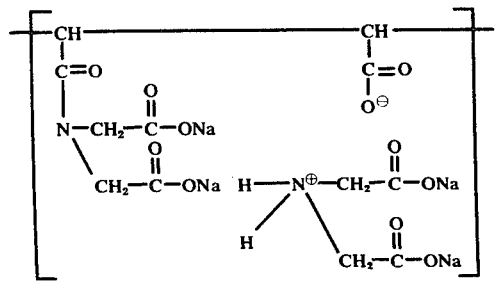

4. The method of claim 1 wherein the polymer composition employed therein comprises recurring units of the following formula:

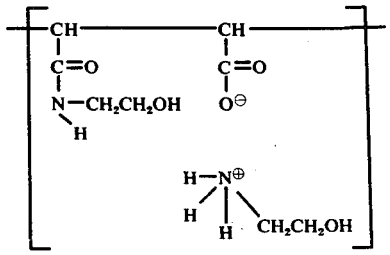

5. The method of claim 1 wherein the polymer composition employed therein comprises recurring units of the following formula:

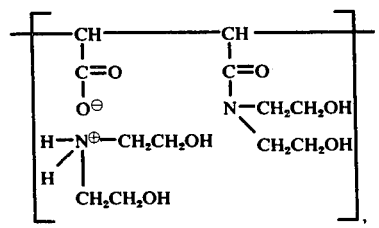

6. The method of claim 1 wherein the polymer composition employed therein comprises recurring units of the following formula:

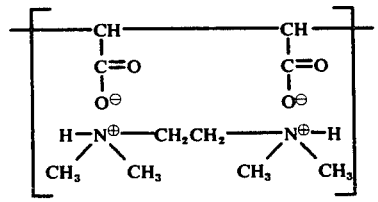

7. The method of claim 1 wherein the said system is treated with 1.0 to 200 parts per million by weight of the total aqueous content of the said system, of a composition as set forth therein.

8. The method of claim 1 wherein the composition employed therein additionally includes a copper corrosion inhibitor selected from the group consisting of 1,2,3-triazoles, thiols of thiazoles, oxazoles, and imidazoles, said copper corrosion inhibitor being present in an amount of up to about 10% by weight.

* * * * *